No. 663,623. Patented Dec. 11, 1900.
D. CAMERON, F. J. COMMIN & A. J. MARTIN.
APPARATUS FOR GENERATING GAS.
(Application filed Aug. 13, 1898.)
(No Model.) 5 Sheets—Sheet. 1.

Witnesses:
S. M. Dorsett,
Blau Shoumaker

Inventors.
D. Cameron
F. J. Commin
A. J. Martin
By L. F. C. Somes
Attorney.

No. 663,623. Patented Dec. 11, 1900.
D. CAMERON, F. J. COMMIN & A. J. MARTIN.
APPARATUS FOR GENERATING GAS.
(Application filed Aug. 13, 1898.)
(No Model.) 5 Sheets—Sheet 2.
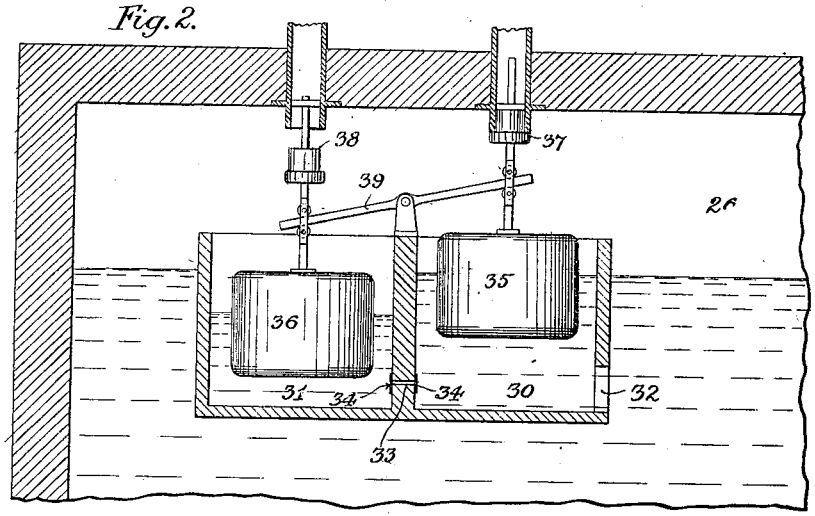
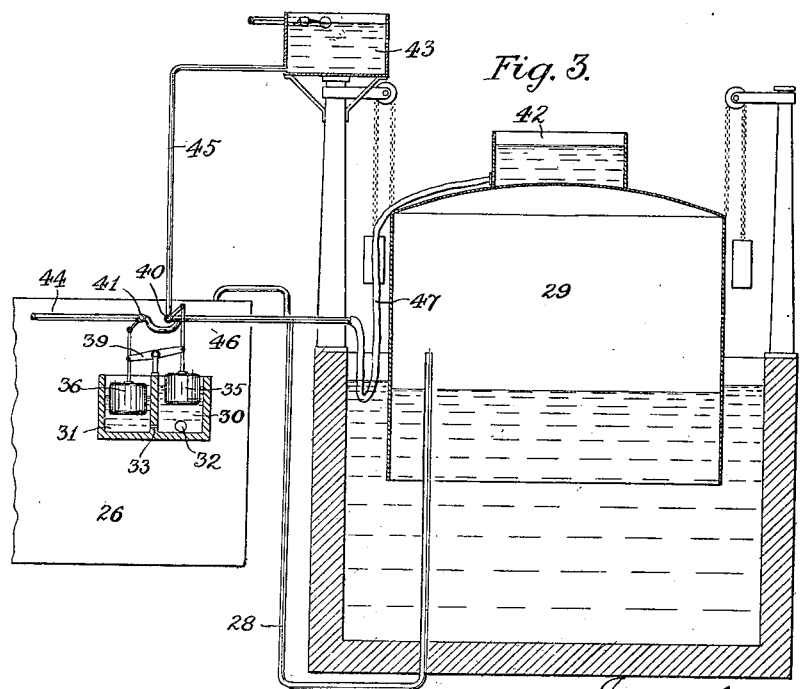

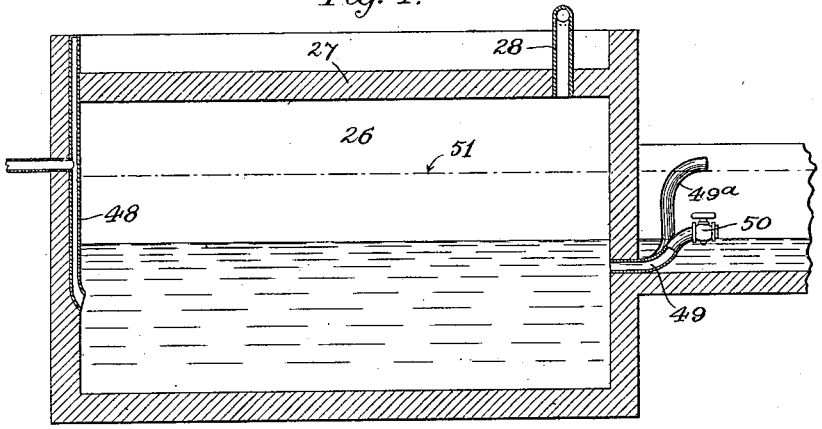
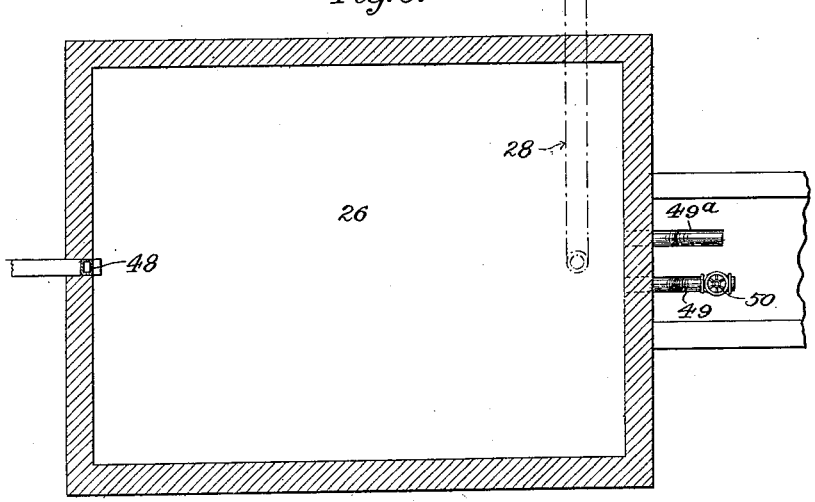

No. 663,623. Patented Dec. 11, 1900.
D. CAMERON, F. J. COMMIN & A. J. MARTIN.
APPARATUS FOR GENERATING GAS.
(Application filed Aug. 13, 1898.)
(No Model.) 5 Sheets—Sheet 5.
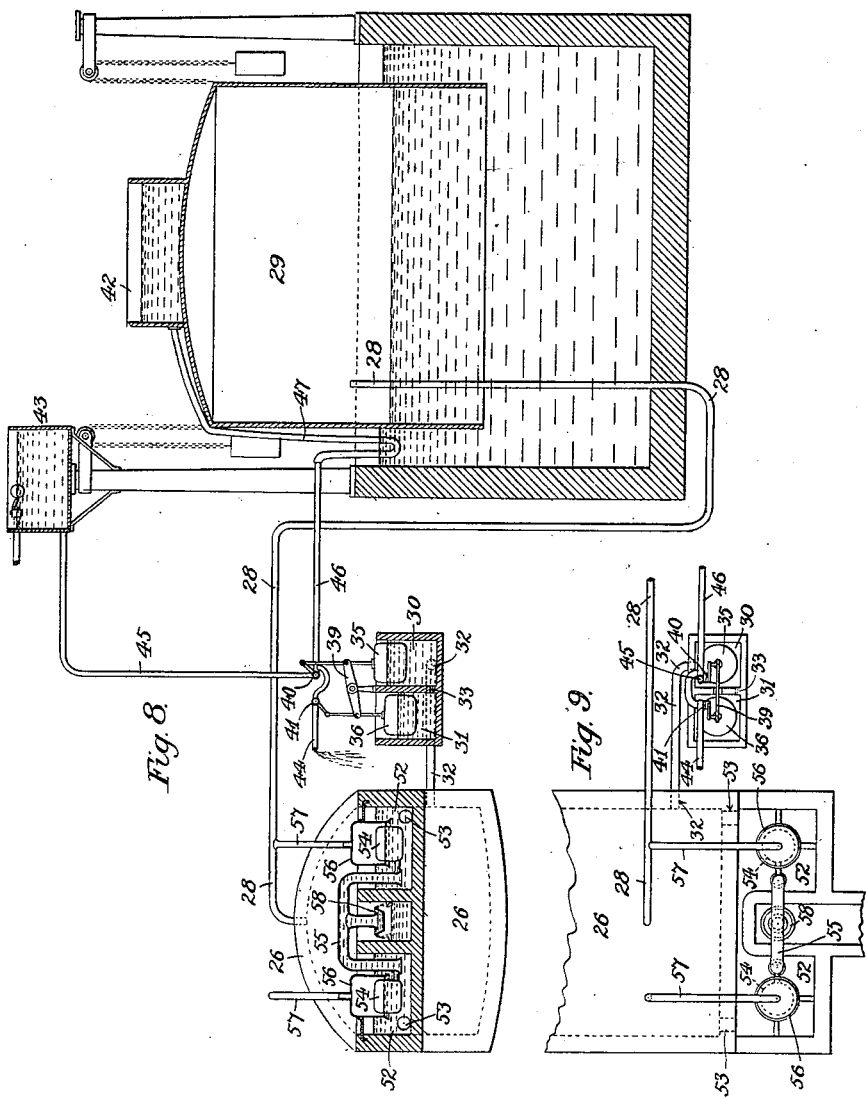
WITNESSES
INVENTOR

UNITED STATES PATENT OFFICE.

DONALD CAMERON, FREDERICK J. COMMIN, AND ARTHUR J. MARTIN, OF EXETER, ENGLAND.

APPARATUS FOR GENERATING GAS.

SPECIFICATION forming part of Letters Patent No. 663,623, dated December 11, 1900.

Application filed August 13, 1898. Serial No. 688,501. (No model.)

*To all whom it may concern:*

Be it known that we, DONALD CAMERON, FREDERICK JAMES COMMIN, and ARTHUR JOHN MARTIN, subjects of the Queen of Great Britain, residing at Exeter, in the county of Devon, England, have invented new and useful improvements in the generation of gas for lighting, heating, and power purposes from sewage or other decaying organic matter and in tanks for the purification of sewage and in apparatus for controlling the supply of gas therefrom, (for which we have made applications for Letters Patent in Great Britain, bearing No. 1,188, dated January 15, 1898, and No. 5,671, dated March 8, 1898,) of which the following is a specification.

Our invention relates to the generation of gas from sewage or other decaying organic matter and to improvements in tanks for the purification of sewage and means for controlling the supply of gas from such tanks.

In cases where sewage is inclosed in covered tanks we have found that gases will be generated which may be beneficially and economically employed for the purpose of illumination or heating or for obtaining motive power in explosive-motors.

We will now proceed to describe our invention in connection with the accompanying drawings, in which—

Figure 1:
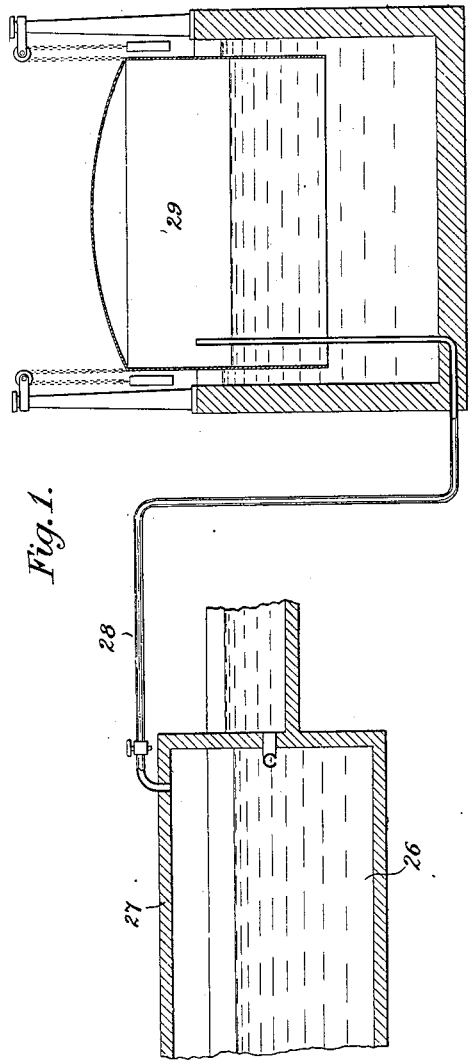
Figure 6:
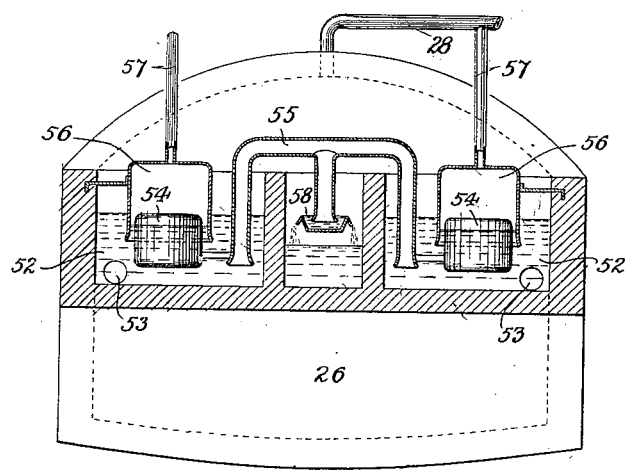
Figure 7:
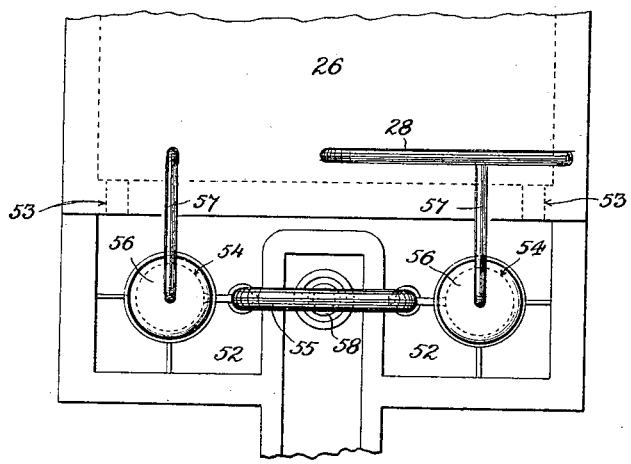

Figure 1 is a longitudinal sectional view of a simple form of apparatus which may be employed in carrying out our invention. Fig. 2 is an enlarged sectional view showing an arrangement of valves and floats for use when two gas-holders are employed. Fig. 3 illustrates an arrangement similar to that shown in Fig. 2 for use with a single gas-holder. Fig. 4 is a longitudinal sectional view of a tank provided with means for creating a pressure within same in order to expel the gas generated; and Fig. 5 is a sectional plan view of same, the upper part and cover of the tank being removed. Fig. 6 is a longitudinal sectional view of means we may employ for the purpose of maintaining a constant pressure, and Fig. 7 is a plan view of same. Fig. 8 represents a longitudinal sectional view of an apparatus in which the features illustrated in Fig. 3 are combined with those illustrated in Figs. 6 and 7. Fig. 9 represents a plan view of part thereof.

In carrying out our invention with the apparatus shown in Fig. 1 it will be seen that we provide a receptacle 26, into which the sewage is passed, such receptacle having a cover 27 and a pipe or pipes 28 for leading off the gas for use as required. The receptacle 26 may or may not be used in purifying the sewage. The decaying organic matter contained in the sewage thus confined produces a gas which may be utilized for illuminating, heating, or power purposes. This gas will vary in composition with the character of the organic matter contained in the sewage.

For the purpose of storing the gas generated in receptacle 26, so as to give a constant supply irrespective of fluctuations in the generation of the gas, a gas-holder 29 is preferably provided, being connected with the generating-receptacle, as shown by the pipe 28. Such gas-holder may be of any suitable construction and is connected by pipes in the usual way with the places at which the gas is to be utilized.

In cases where the level of the liquid in a tank for the treatment of sewage is liable to rise and fall a gas-holder or gas-holders may be employed for the purpose of returning gas into such tank to admit of such fall in the level of the sewage, Fig. 2 illustrating an arrangement of valves which may be used when two gas-holders are employed. In this figure it will be seen that two chambers 30 and 31 are provided, the chamber 30 being in free communication with the tank 26 by means of opening 32, while chamber 31 communicates with chamber 30 by a very small aperture 33, the ends of which are preferably covered by screens 34 to prevent it becoming choked. In the chambers are floats 35 and 36, each of which is connected to a valve 37 or 38, controlling the passage from the receptacle 26 to one of the two gas-holders, so that on one of the floats rising the valve with which it is connected will be closed and when the float falls such valve will be opened. The floats 35 and 36 are preferably connected by a rocking lever 39, so that when one rises the other falls, and vice versa.

The action of the apparatus is as follows: In one of the gas-holders—say that controlled by valve 38—low pressure or a partial vacuum is maintained, so that gas may readily pass into it from the receptacle 26, while in the other gas-holder, controlled by valve 37, a greater pressure is maintained, so that gas may be forced back from the holder into the tank when the level of the liquid in the latter falls. The level of the liquid in the two chambers 30 and 31 approximates or tends to equal that of the liquid in the tank. In chamber 30, which is freely connected with the latter through opening 32, the level will be always the same as in the tank; but in chamber 31, which is connected with chamber 30 through the small aperture 33, above referred to, the changes in level will not take place so quickly as they will in the tank, so that when the level of the liquid in the tank is rising, as represented in Fig. 2, the level in chamber 30 will, as shown, be above that in chamber 31. The relative levels of the floats 35 and 36 correspond with those of the liquid in the chambers 30 and 31, so that when the level of the liquid in the receptacle 26 is rising the valve 38, controlling the passage leading to the receiving gas-holder, will be opened, so that gas can pass from the tank into same. When, on the other hand, the level of liquid in the tank is falling, the level in chamber 30 will be below that in chamber 31, so that valve 37 will be opened, thus permitting gas to pass from the other or delivering gas-holder into the tank.

An arrangement of a similar nature and for a similar purpose to that above described is shown in Fig. 3, in which, however, one gas-holder only is employed. In this case the chambers 30 and 31, with apertures 32 and 33, floats 35 and 36, and rocking lever 39, will be arranged as above described, but the floats instead of actuating two valves on pipes connecting the receptacle 26 with the two gas-holders will actuate valves 40 and 41, the former connecting a water vessel 42 on the top of the gas-holder 29 with a tank 43 or other source of supply at a higher level and the latter connecting such vessel 42 with a discharge-pipe 44. The tank 43 may be supplied with water from any suitable source, such supply being controlled by a ball-cock or other suitable means for cutting same off on the water reaching a certain level in such tank. The upper part of the receptacle 26 would be ordinarily in free communication, through pipe 28, with the gas-holder 29; but a valve may be provided, so as to close the communication in case of need. The action of the floats 35 and 36 in this arrangement will be the same as already described in connection with Fig. 2; but in this case when the level of the sewage in receptacle 26 is falling the result of the movement of the floats will be that the valve 40 will be opened, thus allowing water or other liquid to pass from tank 43, through pipe 45, valve 40, pipe 46, and flexible connecting-pipe 47, into the vessel 42 on the top of the gas-holder, thereby causing the latter to descend, and so forcing the gas contained in same back into the receptacle 26 through pipe 28. On the other hand, when the level of the liquid in the tank is rising, as represented in Fig. 3, valve 40 will be closed and valve 41 opened, so that the liquid in the vessel 42 can escape through flexible connecting-pipe 47, pipe 46, valve 41, and discharge-pipe 44, thereby lightening the gas-holder, which will then ascend to receive the gas from receptacle 26.

A further object of our invention is to provide means whereby the gas generated in tanks or receptacles by the decomposition of sewage or other organic matter, as above described, may be conveniently drawn off for use when required. With this object in view it is desirable to have means for producing a pressure in the tank or other receptacle in order to expel the gas generated. Figs. 4 and 5 show one arrangement which may be employed for this purpose, and in these figures it will be seen that the receptacle 26 is provided with a cover 27, as previously described, and that the inlet 48 and outlet 49 for the liquid under treatment are submerged, leaving no communication with the outside except the pipe or passage 28, through which the gas is drawn off. Two or more outlets 49 and 49$^a$ (or two or more branches from the same outlet) are provided, such outlets opening at different levels, and through any of which the outflowing liquid may be caused to pass. When it is not desired to draw off gas from the tank, the liquid will be drawn off by the lower outlet 49, while when it is desired to draw the gas off such lower outlet 49 will be closed by means of the valve 50, and the outflowing liquid will therefore be forced to rise to the level of the higher outlet 49$^a$, as shown in broken lines at 51 in Fig. 4. By reason of the liquid being thus raised at the outlet above that in the tank or receptacle a pressure corresponding to the difference in level will be created in the tank, under which pressure the gas will pass off through the pipe 28. When the gas is no longer to be drawn off, the valve 50 on the lower outlet 49 is opened, and the liquid in the tank then tends to return again to its former level, the space vacated by the liquid being occupied by the gas generated.

With the arrangement above described it is obvious that the tendency will be to give a varying pressure, greatest when the lower outlet 49 is first closed and becoming less as the level of the liquid in the tank rises; but by the arrangement shown in Figs. 6 and 7 we are enabled to keep the pressure approximately constant. This arrangement (which may be used either alone or in conjunction with that shown in Figs. 4 and 5) consists substantially in the employment of a chamber 52 outside the tank 26, into which the outflow from the latter passes by a submerged outlet or outlets 53, the outlet from such chamber 52 being capable of adjustment so as to be at a constant height above the liquid in the tank. The outlet from the chamber may consist of an opening or openings with means for throttling the same, or a series of weirs at different levels with sluices or other means for cutting off access to the lower weirs, or a single weir having a movable crest the height of which is controlled by a float or floats, or, as shown, a pipe 55, the height of whose upper end is controlled by a float or floats 54. If such a pipe is used, it may, as shown, be branched and pass over the wall of the chamber as a siphon or may be connected with a fixed outlet by a pivoted connection or a flexible tube or may slide through a socket. In the last case leakage of liquid through the socket may be prevented by a mercury seal. Whatever form the outlet from the chamber 52 takes, the adjustment of such outlet to carry off the outflow at the desired level is effected by a float or floats 54 in the chamber itself or another chamber in communication therewith, the pipe 55, forming the outlet shown, being carried by the float or floats 54 and such float or floats being under a cover or covers 56, whose edges dip into the liquid, the spaces within such cover or covers being in communication with the upper part of the tank through pipes 57. The lip 58 of the overflow is so adjusted with respect to the float or floats that the difference in level of the surface of the liquid in the chamber and the surface of the liquid around the floats shall be equal to the pressure which it is desired to maintain in the tank. It will be seen that with this arrangement if the level of the liquid in the receptacle or tank 26 rises or falls the floats 54 will also be raised or lowered, and as the pipe 55, forming the outlet, is carried by such floats its lip or overflow 58 will be correspondingly moved, so that its level in relation to that of the liquid in the chamber 52 (upon which the degree of the pressure created in the receptacle or tank 26 depends) will always remain practically the same, and therefore the pressure of the liquid on the gas generated in the receptacle 26 will also remain practically constant.

In Figs. 8 and 9 we have illustrated an arrangement in which the apparatus shown in Fig. 3 for varying the pressure of the gasholder on the gas contained therein, so as to enable the gas-holder to rise when gas is passing into same and to fall when such gas is being drawn off for use, is combined with the apparatus shown in Figs. 6 and 7 for insuring that the pressure on the gas when being so drawn off for use shall be approximately constant. In this arrangement the gas passes, the same as in Fig. 3, from the upper part of the tank 26 through pipe 28 into the gasholder 29, apparatus similar to that shown in such Fig. 3 being also employed for the purpose of varying the pressure on the gas-holder to enable it to rise or fall when the gas passes into or is drawn off from same, such apparatus depending for its operation on the relative positions of the floats 35 and 36 in chambers 30 and 31. The chamber 30 is, as hereinbefore stated, in free communication with the liquid in the tank 26 through pipe 32, while chamber 31 is connected with chamber 30 by an opening 33 of such size that the liquid can only pass through same very slowly, so that when the liquid rises in chamber 30 approximately equally with a rise in the level of the liquid in tank 26 the level of the liquid passing into chamber 31 will lag behind that in chamber 30, consequently changing the relative positions of the floats 35 and 36, situated in such chambers. The floats are connected together by lever 39, the opposite ends of which have connections to valves or cocks 40 and 41, by which, as fully described in connection with Fig. 3, the pressure on the gas-holder is regulated. In the positions shown in Figs. 8 and 9, the level of liquid in the tank 26 is rising, so that the level in chamber 31 is below that in chamber 30, which is in free communication with the tank, and the gas-holder 29 has therefore to be raised to receive the gas driven off by the increased pressure due to the rise of level in the tank. The vessel 42, mounted on the top of the gas-holder, should therefore be lightened, and this is effected by the change in the relative positions of the floats 35 and 36, such change operating the valves 40 and 41, as when, as shown, float 35 is the higher, valve 40 will be closed and valve 41 opened, so that liquid can pass from vessel 42 through flexible pipe 47, pipe 46, and valve 41 to pipe 44, whence it may be discharged, as shown. If, on the other hand, the level of liquid in tank 26 is falling, so that consequently float 36 is in a higher position than float 35, the valve 41 will be closed and valve 40 opened, and water or other liquid will then be able to pass from tank 43, through pipe 45, valve 40, pipe 46, and flexible pipe 47, into vessel 42, thereby increasing the weight of the gas-holder and the pressure of the latter on the contained gas. In order that the pressure of the liquid on the gas generated in the tank may be rendered practically constant and to overcome any friction in the working of the apparatus, the means shown separately in Figs. 6 and 7 may be combined with this arrangement, as illustrated in Figs. 8 and 9. In this apparatus the pressure is automatically regulated by means of a pair of floats 54, mounted under bells or covers 56 and carrying a siphon 55, which forms the outlet for the sewage and the outlet end of which is provided with a lip or overflow 58, the height of which in relation to the floats can be adjusted. The bells 56 are arranged in a chamber 52 in communication through passages 53 with the interior of tank 26 and are at their upper parts connected by pipes 57 with the upper part of the tank, so that there is a pressure on the liquid under such bells corresponding to that on the liquid in the tank. It therefore follows that the floats will be operated by any change in the level in the tank, so that as such floats carry the outlet-siphon 55 the latter will be correspondingly raised or lowered, and therefore the pressure on the gas in the tank will remain practically constant, as the lip or overflow 58 of the siphon 55 is always at a certain desired height in relation to the liquid in the tank.

What we claim as our invention, and desire to secure by Letters Patent, is—

1. In a gas apparatus the combination of a covered gas-generator, a gas-receiver connected therewith, and means for drawing off the gas from the generator, said means being operated by the rise and fall of the contents of the generator.

2. The combination of a covered gas-generator, a gas-receiver connected therewith for receiving and storing the gas generated in said generator, and means disposed in said generator for regulating the flow of gas therefrom.

3. The combination of a covered gas-generator, a gas-receiver connected therewith, means for conveying the gas from said generator to said receiver, and floats disposed in said generator for regulating the flow of gas therefrom.

4. The combination of a covered gas-generator, a gas-receiver connected therewith, means operated by the rise and fall of the contents of the generator for regulating the flow of gas therefrom, and means actuated by said regulating means for varying the pressure in said receiver.

5. The combination of a covered gas-generator, a receiver connected therewith for receiving the gas generated therein, means for drawing off the gas from said generator, and means for creating a difference in pressure between the generator and the receiver.

6. The combination of a covered gas-generator, a receiver connected therewith for receiving the gas generated therein, means for drawing off the gas from said generator, and means for maintaining a constant difference in pressure between the generator and the receiver.

7. The combination of a covered gas-generator, a gas-receiver connected therewith, means for drawing off the gas from said generator, and means for maintaining a difference in level between the surface of the liquid in the generator and the surface of the liquid outside thereof, whereby a pressure in the generator is maintained.

8. The combination of a gas-generator adapted to contain sewage, and provided with a movable outlet, and a gas-receiver connected with said generator.

9. The combination of a gas-generator adapted to contain sewage and provided with a movable outlet, a float for controlling said outlet, and a gas-receiver connected with said generator.

10. The combination of a gas-generator adapted to contain sewage and provided with a movable outlet, a float for controlling said outlet, said float being immersed in a liquid under the same pressure as that in the generator, and a gas-receiver connected with said generator.

11. The combination of a gas-generator adapted to contain sewage and provided with an outlet comprising a vertically-movable siphon, and a gas-receiver connected with said generator.

12. The combination of a gas-generator adapted to contain sewage, and provided with an outlet comprising a vertically-movable siphon, a float for supporting said siphon, and a receiver for the gas connected with said generator.

13. The combination of a gas-generator provided with an outlet comprising a vertically-movable siphon, a float for supporting said siphon, said float being immersed in a liquid under the same pressure as that in the generator, and a gas-receiver connected with said generator.

14. The combination of a covered receptacle adapted to contain sewage, a gas-receiver connected therewith, a vessel mounted on said receiver, a pipe connecting said receptacle with said receiver, supply and discharge pipes connected with said vessel, and valves disposed on said pipes and adapted to be operated by the rise and fall of the contents of said covered receptacle, thereby regulating the inflow and outflow of liquid in said vessel.

15. The combination of a covered receptacle, a gas-receiver connected therewith, a vessel mounted on said receiver, a pipe connecting said covered receptacle with said gas-receiver, supply and discharge pipes connected with said vessel, valves disposed on said pipes, and floats connected with said valves for opening and closing them, said floats being actuated by the rise and fall of the contents of the covered receptacle.

16. The combination of a covered receptacle, a gas-receiver connected therewith, a vessel mounted on said receiver, a water-supply tank disposed on a plane above said vessel, a supply-pipe leading from said tank to said vessel, a valve disposed in said pipe, a discharge-pipe connected with said vessel, a valve in said pipe, and means for opening and closing said supply and discharge valves, said means being operated by the rise and fall of the contents of the covered receptacle.

DONALD CAMERON.
FRED. J. COMMIN.
ARTHUR J. MARTIN.

Witnesses:
EDMUND WILLIAM JUKE,
JOHN GALE PEDRICK.